United States Patent [19]

Lina et al.

[11] Patent Number: 5,439,998
[45] Date of Patent: Aug. 8, 1995

[54] FLUORINE-CONTAINING COPOLYMERS AND THEIR USE FOR COATING AND IMPREGNATING VARIOUS SUBSTRATES

[75] Inventors: Marie-Jose Lina, Lyons; Christian Collette, Paris; Jean-Marc Corpart, Nogent-Sur-Oise; Andre Dessaint, Clermont, all of France

[73] Assignee: Elf Atochem, Puteaux, France

[21] Appl. No.: 283,762

[22] Filed: Aug. 3, 1994

Related U.S. Application Data

[63] Continuation of Ser. No. 973,036, Nov. 10, 1992, abandoned.

[30] Foreign Application Priority Data

Nov. 12, 1991 [FR] France ................... 91 13867

[51] Int. Cl.⁶ ............................................. C08F 220/22
[52] U.S. Cl. ................................. 526/243; 526/245; 526/246; 525/326.2; 428/422
[58] Field of Search ................. 526/243, 245, 246; 525/326.2; 428/422

[56] References Cited

U.S. PATENT DOCUMENTS

| | | |
|---|---|---|
| 2,138,763 | 11/1938 | Graves . |
| 3,766,156 | 10/1973 | Kine et al. ............... 526/245 |
| 4,147,851 | 4/1979 | Raynolds ................. 526/245 |
| 4,366,299 | 12/1982 | Dessaint . |
| 5,010,153 | 4/1991 | Famili et al. ............ 526/245 |
| 5,225,505 | 7/1993 | Wiegert .................. 526/245 |

FOREIGN PATENT DOCUMENTS

| | | |
|---|---|---|
| 588024 | 9/1989 | Australia . |
| 0408917 | 1/1991 | European Pat. Off. . |
| 0034527 | 8/1981 | France . |
| 0195714 | 9/1986 | France . |
| 471768 | 4/1969 | Germany . |
| 58-34867 | 3/1983 | Japan ..................... 526/245 |
| 1136891 | 12/1968 | United Kingdom . |

OTHER PUBLICATIONS

French Search Report, FR 9113867 & FA 464108, dated Jul. 3, 1992.
Official Gazette 1046 TMOG 2, Sep. 4, 1984.

Primary Examiner—Joseph L. Schofer
Assistant Examiner—N. Sarofim
Attorney, Agent, or Firm—Morgan & Finnegan

[57] ABSTRACT

Fluorine-containing copolymers for use in coating substrates or for incorporation thereinto in order to impart water- and oil-repellent properties thereto are provided, starting from the following monomers:

a) a polyfluorinated alcohol ester with a monocarboxylic alkene acid;
b) an amino-alcohol ester with a monocarboxylic alkene acid;
c) vinyl monomer having an alkylcarboxylate or alkylether group.

13 Claims, No Drawings

FLUORINE-CONTAINING COPOLYMERS AND THEIR USE FOR COATING AND IMPREGNATING VARIOUS SUBSTRATES

This is a continuation of application Ser. No. 07/973,036, filed on Nov. 10, 1992 now abandoned.

BACKGROUND OF THE INVENTION

1. Field of the Invention

The present invention relates to novel fluorine-containing copolymers and their use for coating and impregnating various substrates such as textile, leather, wood, non-woven fabrics metals, concrete, and, more particularly, paper and similar articles for imparting oil- and water-repelling properties thereto.

2. Description of Prior Art

Numerous fluorinated derivatives are already being proposed for obtaining these properties. However, even though such derivatives exhibit good properties on textiles and on leather, in order to obtain the same properties on paper and similar articles, it is necessary to employ them with an active ingredient content that is far too high (in fact, an amount of carbon-linked fluorine that is too high) in order to obtain an economically acceptable result.

By way of products that are more specially suitable for paper, chromium complexes have been proposed in French patents 1 172 664 and 2 022 351 and in U.S. Pat. No. 3,907,576 Such complexes which do in fact impart useful oil-repellent properties to paper and similar articles nevertheless suffer from the disadvantage of having a green color and of transferring this color to substrates to which they are employed, thus limiting their use.

Polyfluoroalkyl or cycloalkyl phosphates have also been proposed for papermaking use (French patents 1 305 612, 1 317 427, 1 388 621, 2 055 551, 2 057 793 and 2 374 327, U.S. Pat. Nos. 3,083,224 and 3,817,958, German patent 2 405 042) as well as hydroxypropyl polyfluoroalkyl phosphates (U.S. Pat. No. 3,919,361). However, these products which confer good oil-resisting properties to paper suffer from the serious handicap of not conferring any water-repelling properties thereto. Because of this, paper treated with these products does not exhibit any protection vis-a-vis aqueous product. Moreover, these products have no sizing ability and even strongly reduce the effectiveness of sizing agents, thus causing problems with writing and printing.

Moreover, the evolution of culinary techniques resulting from increasing use of microwave ovens has required new materials to be developed for food packaging. The use of aluminum receptacles is not allowed, plastics materials withstand heat poorly and moreover require large amounts of petroleum-based products to be used, and the problem of destroying and recycling them are considerable. The material of choice would hence be cardboard if it were possible to impart excellent water- and oil-repellent properties thereto.

For the treatment of paper and similar articles, the use has been proposed of perfluoroaliphatic acrylic and methacrylic copolymers with dialkylaminoalkyl cationic acrylic or methacrylic esters in their salt, quaternized or N-oxide form. However, the compositions claimed suffer from the disadvantage of possessing insufficient water and/or oil-repelling properties (U.S. Pat. No. 4,147,851; EP 0109.171) or involve the presence of a co-monomer which apparently is suspected of giving rise to long term toxic effects (French Patent 2 476 097).

SUMMARY OF THE INVENTION

The present invention relates to novel fluorine containing products which can be readily diluted using water, can be applied to paper using various techniques (size-press, or incorporation in the pulp) and which confer to the paper, without a need for adjuvants (sequestering agents, retention agents, fixing resins etc.), excellent water- and oil-repellency while at the same time imparting to the thus-treated paper, and despite the low doses of fluorine deposited, an impressive degree of resistance to liquids of aqueous origin, to fats as well as to low surface tension solvents.

The compositions claimed are also very effective in protecting various supports such as leather, non-woven fabrics, construction materials.

The products according to the present invention comprise fluorine-containing copolymers, optionally in salt or quaternized form, comprising by weight:

(a) 92 to 50% of one or several polyfluorinated monomers of general formula:

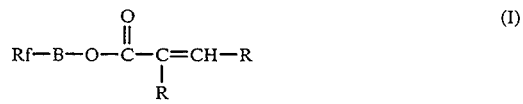

in which:

Rf is a straight chain or branched perfluorinated radical, having 2 to 20 and preferably 4 to 16 carbon atoms;

B is a bivalent bridge linked to 0 by a carbon atom and being able to include one or several oxygen, sulfur and/or nitrogen atoms;

one symbol R representing a hydrogen atom and the other symbol R being a hydrogen atom or an alkyl radical having 1 to 4 carbon atoms;

(b) 1 to 25% of one or several monomers of general formula:

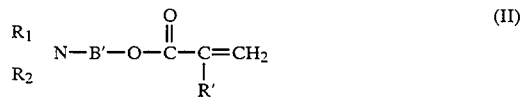

in which:

B' is a straight or branched chain alkylene radical having 1 to 4 carbon atoms,

R' is a hydrogen atom or an alkyl radical having 1 to 4 carbon atoms;

$R_1$ and $R_2$, which can be the same or different, each represent a hydrogen atom or a linear or branched alkyl radical containing 1 to 18 carbon atoms, hydroxyethyl or benzyl, or $R_1$ and $R_2$ together with the nitrogen atom to which they are bound form a morpholino, piperidino or pyrrolidinyl-1 radical;

(c) 1 to 25% of a vinylic derivative of general formula:

in which:

R" can be an alkylcarboxylate or alkylether group containing 1 to 18 carbon atoms;

(d) 0 to 10% of any monomer other than monomers of formulae I, II, III.

The fluorine-containing monomers of formula (I) can be prepared using known methods, for example par esterification of the corresponding polyfluorinated alcohols of formula:

by means of a monocarboxylic alkene acid of formula:

such as, for example, acrylic acid, methacrylic or crotonic acid, in the presence of a catalyst such as sulfuric acid or p-toluenesulfonic acid. Instead of the acids of formula (V), esters, anhydrides or halides thereof can be used. As an example of polyfluorinated alcohols of formula (IV), those of formulae (VI-1) to (VI-10) below can particularly be used:

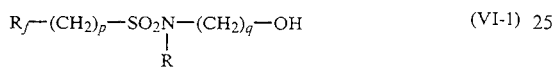

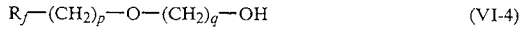

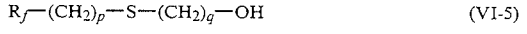

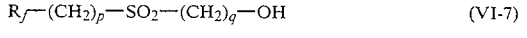

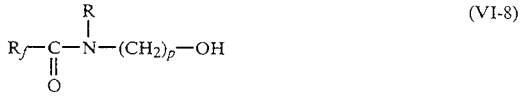

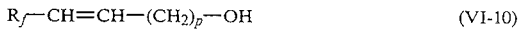

in which $R_f$ and R have the same meaning as above, the symbols p and q, which can be the same or different, each represent a whole number ranging from 1 to 20, and preferably are ranging from 2 to 4, included.

For economic and practical reasons, it is particularly useful to employ a mixture of compounds representing different Rf radicals.

As examples of monomers of formula (II), the following amino-alcohol acrylates and methacrylates can be particularly mentioned: dimethylamino-2-ethanol, diethylamino-2-ethanol, dipropylamino-2-ethanol, diisobutylamino-2-ethanol, N-tertio-butylamino-2-ethanol, N-tert-butyl-N-methylamino-2-ethanol, morpholino-2-ethanol, N-methyl-N-dodecylamino-2-ethanol, N-ethyl-N-octadecylamino-2-ethanol, N-ethyl-N-(ethyl-2-hexyl)amino-2-ethanol, piperidino-2-ethanol, (pyrrolidinyl-1)-2-ethanol, diethylamino-3-propanol-1, diethylamino-2-propanol-1, dimethylamino-1-propanol-2, diethylamino-4-butanol-1, diisobutylamino-4-butanol-1, dimethylamino-1-butanol-2, diethylamino-4-butanol-2. These esters can for example be prepared in accordance with the method described in U.S. Pat. No. 2,138,763. The preferred monomer of formula (II) is dimethylaminoethyl methacrylate or N-tertiobutylaminoethyl methacrylate.

The following can be cited as examples of vinylic monomers of formula (III) that can be used in the present invention:

vinylic esters such as vinyl acetate, vinyl propionate, vinylic esters of acids known commercially as "Versatic acids", vinyl isobutyrate, vinyl senecioate, vinyl isodecanoate, vinyl stearate;

halogenated or unhalogenated alkyl-vinylic ethers, such as cetylvinylether, dodecylvinylether, isobutylvinylether, ethylvinylether, chloro-2-ethylvinylether. The preferred monomer of formula (III) is vinyl acetate.

The following are examples of co-monomers (d) that can be used in the present invention:

halogenated or unhalogenated lower olefinic hydrocarbons, such as ethylene, propylene, isobutene, chloro-3-isobutene-1, butadiene, isoprene, the chloro- and dichloro-butadienes, the fluoro- and difluoro-butadienes, dimethyl-2,5-hexadiene-1, 5, diisobutylene;

vinyl, allyl or vinylidene halides such as vinyl or vinylidene chloride, vinyl or vinylidine fluoride, allyl bromide, methallyl chloride;

styrene and derivatives thereof, such as vinyl-toluene, α-methyl-styrene, α-cyanomethyl-styrene, divinyl-benzene, N-vinylcarbazole;

alkylvinylketones such as methylvinylketone;

unsaturated acids, such as acrylic, methacrylic α-chloro-acrylic, crotonic, maleic, fumaric, itaconic, citraconic and senecioic acid, and anhydrides and esters thereof such as allyl, methyl, butyl, isobutyl, hexyl, heptyl, ethyl-2-hexyl, cyclohexyl, lauryl, stearyl or cellosolve acrylates and methacrylates, dimethyl maleate, ethyl crotonate, methyl acid maleate, butyl acid itaconate, glycol or polyalkyleneglycol diacrylates and dimethacrylates;

unsaturated esters of formula:

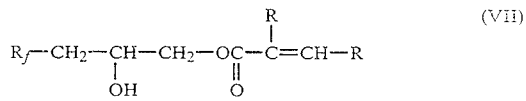

obtained by condensation of a fluorine-containing epoxide:

on a monocarboxylic alkene acid of formula (V); and chlorides of formula (IX):

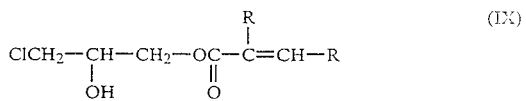

obtained by addition of epichlorhydrine onto an acid of formula (V);

mono- and poly-ethyleneglycol or -propyleneglycol ether acrylates and methacrylates of formula:

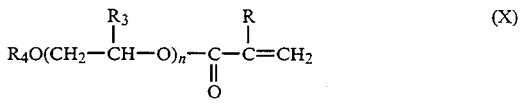

in which $R_3$ represent a hydrogen atom or a methyl radical; $R_4$ represent an alkyl radical and n is a whole number comprised between 1 and 10;

acrylonitrile, methacrylonitrile, chloro-2-acrylonitrile, cyano-2-ethyl acrylate, methylene glutaronitrile, vinylidene cyanide, alkyl cyanoacrylates such as isopropyl cyanoacrylate, trisacryloyl-hexahydro-s-triazine, vinyltrichlorosilane, vinyltrimethoxysilane, vinyltriethoxysilane;

allyl alcohol, allylglycolate, isobutenediol, allyloxyethanol, o-allylphenol, divinylcarbinol, glycerolallylether, acrylamide, methacrylamide, maleamide and maleimide, N-(cyano-ethyl)acrylamide, N-isopropyl-acrylamide, diacetone-acrylamide, N-(hydroxymethyl)-acrylamide and methacrylamide, N-(alkoxymethyl)-acrylamides and methacrylamides, glyoxal-bis-acrylamide, sodium acrylate or methacrylate, sulfo-2-ethyl acrylate, vinyl-sulfonic and styrene-p-sulfonic acids and alkaline salts thereof, amino-3-crotononitrile, monoallylamine, vinylpyridines, glycidyl acrylate or methacrylate, allylglycidylether, acroleine;

allyl esters such as allyl acetate and allyl heptanoate.

The products according the invention are prepared in a manner known per se by copolymerization of the monomers in solution in an inert solvent or in a mixture of inert solvents such as the ketones (for example, acetone, methylethylketone, methylisobutylketone); alcohols (for example isopropanol), esters (for example ethyl acetate or butyl acetate), ethers (for example diisopropylether, ethylic or methylic ether of ethylene- or propylene-glycol, tetrahydrofuran, dioxan), aliphatic or aromatic hydrocarbons, halogenated hydrocarbons (for example perchlorethylene, trichloro-1,1,1-ethane, trichlorotrifluoroethane), dimethylformamide, N-methyl-pyrrolidone-2, butyrolactone, DMSO, glycol ethers and derivatives thereof. Water-miscible solvents are preferably employed.

The applicant is particularly claiming N-methyl-pyrrolidone-2 (N.M.P.) or binary NMP/acetone mixtures as a polymerisation solvent. The use of such solvents yields solutions which are perfectly transparent and stable, the application properties (notably on paper) are improved in a spectacular fashion compared to products synthesized with isopropanol and/or binary or ternary mixtures. The total concentration of the monomers can vary from 5 to 60% by weight.

Polymerization is carried out in the presence of one or several initiator(s) used in an amount of 0.1 to 1.5% on the basis of the total weight of the monomers employed. As initiators, peroxide can be used such as, for example, benzyl peroxide, lauryl peroxide, succinyl peroxide and tertiobutyl perpivalate, or azoic compounds such as, for example, azo-2,2'-bis-isobutyronitrile, azo-4,4'-bis-(cyano-4-pentanoic) acid and azodicarbonamide. It is also possible to operate in the presence of U.V. radiation and photo-initiators such as benzophenone, methyl-2-anthraquinone or chloro-2-thioxanthone. The polymer chain links can, if desired, be regulated using chain transfer agents such as alkyl-mercaptans, carbon tetrachloride or triphenylmethane, employed in amount of 0.05 to 1% compared to the total monomer weight.

The reaction temperature can vary over wide limits, i.e. between ambient and the reaction mixture's boiling point. Preferably, a temperature of between 60° C. and 90° C. is used.

Possible production of salts of the copolymer can be done using strong or fairly strong mineral or organic acids, in another words acids having a dissociation constant or first dissociation constant higher than $10^{-5}$. The following can, for example, be cited: hydrochloric, hydrobromic, sulfuric, nitric, phosphoric, acetic, formic, propionic or lactic acids. Preferably, acetic acid is employed.

Instead of converting the copolymer to a salt, it can be quaternized using an appropriate quaternizing agent such as, for example, methyl iodide, ethyl iodide, dimethyl sulfate, diethyl sulfate, benzyl chloride, trimethyl phosphate, methyl p-toluenesulfonate.

The copolymer solution obtained can optionally be diluted with the polymerization solvent or with another solvent or with a mixture of solvent and water. Dilution with water is preferred on ecological grounds. If desired, the copolymer can also be isolated by eliminating the solvent(s).

The substrates that can be rended oil- and water-repellent with the products according the invention, can include principally, paper, cardboard and related products. Many other materials can also be mentioned such as, for example, woven or non-woven cellulose-based articles or regenerated cellulose-based articles, natural, artificial or synthetic fibers such as cotton, cellulose acetate, wool, silk, polyamide, polyester, polyolefin, polyurethane and polyacrylonitrile fibers, leather, plastics materials, glass, wood, metals, porcelain, masonry, painted surfaces.

In the case of paper and cardboard, the solutions of copolymers according the invention are principally applied in an aqueous medium, but also optionally in a solvent medium or in a water and solvent mixture, using known techniques, for example, soaking, impregnation, immersion, spraying, brushing, padding, roller-coating.

On paper and in aqueous solution, the products according to the invention can be applied either to the surface of an already finished support (preferably in an amount of from 0.05 to 0.2% of fluorine based on the weight of the paper), or incorporated directly thereinto, in other words into the paper pulp or papermaking pulp (preferably in an amount of 0.2 to 0.4% of fluorine based on the pulp weight).

Supports treated in this way have good oil-repelling and water-repelling properties after simple drying at ambient temperature or at higher temperatures, followed optionally by heat treatment which, depending of the nature of the support, can be up to 250° C.

In order to obtain good fixing of the copolymers according to the invention onto the substrates to which they are applied and to be able to additionally confer a special effect, it is sometimes advantageous to associate them with certain adjuvants, polymers, heat-condensable products and catalyst suitable for favoring their cross-linking with the support. As such, urea or melamine formol condensates or precondensate, methyloldihydroxyethylene-urea and derivatives thereof, urones, methylol-ethylene-ureas, methylol-propylene-ureas, methylol-triazones, dicyandiamide-formol condensates, methylol-carbamates, methylol-acrylamides or methacrylamides and polymers or copolymers thereof, divinylsulfone, polyamides and cationic derivatives thereof, epoxy derivatives such as diglycidylglycerol, epoxypropyltrialkyl(aryl)ammonium halides such as (epoxy-2,3-propyl)trimethylammonium chloride, N-methyl-N-(epoxy-2,3-propyl)morpholinium chloride, certain halide derivatives such as chloroepoxy-propane and dichloro-propanol, pyridinium salt of ethyleneglycol chloromethylic ether, cationic, oxidized or amphoteric starches can be cited.

In order to evaluate the properties of substrates treated in according of the invention, the applicant has employed the following tests:

Kit value oil-repellency test

This test described in Tappi, vol. 50, No. 10, pages 152A and 153A, RC 338 and UM 511 standard, enables the oil-repellency of substrates by mixtures of ricin oil, toluene and heptane to be measured. These contain variable amounts of the three products:

| Kit Value | Volume of ricin oil | Volume of toluene | Volume of heptane |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

The test consist in gently depositing drops of this mixture onto the treated paper. The drops are allowed to remain on the paper for 15 seconds after which the appearance of the paper or cardboard is carefully observed and a note is made of the degree of wetting or penetration which appears as a brown surface coloration. The number that corresponds to the mixture that contains the highest percentage of heptane which does not penetrate or wet the paper is the Kit value of the paper and is considered as being the degree of oil-repellency of the treated paper. The higher the Kit value the better the oil-repellency of the paper is.

Solvent-barrier test

In the test, 1 cm, in the direction of its length, of a rectangular sample (10 cm × 1 cm) of the substrate to be tested is immersed in essence of anhydrous terebenthine colored with 0.5 g/l of Organol Red B S. Immersion is done in a closed chromatography vessel for 24 hours. Following this the area in mm$^2$ of the spot formed by the colored liquid rising up into the non-immersed portion of the tested substrate is measured.

Water barrier test

In this test, 1 cm, in the lengthwise direction, of a rectangular sample (10 cm × 1 cm) of the substrate to be tested is immersed in water colored with 0.5 g/l of Rhodamine B. Immersion is done in a closed chromatography vessel for 24 hours. Following this, the area, in mm$^2$, of the spot formed by the colored liquid rising up into the non-immersed portion of the tested substrate is measured.

Cobb test

The Cobb and Lowe test (Tappi Standard T 441 codified by the Central Laboratory Test Comity of the Swedish Papermaking Industry (P.C.A. draft 13-59) consists in measuring the weight (in g) of water absorbed during one minute by one square meter of paper supporting a water height of one centimeter.

Oil-repellency test

For certain supports, oil-repellency was measured using the method described in AATCC Technical Manual, Test Method 118-1972, which evaluates the non-wetting properties of the substrate by a series of oily liquids with progressively lower surface tensions (Textile Research Journal, May 1969, page 451).

Hydrostatic pressure resistance test

This test is described in French standard G 07-057 of 1966. The test consist in submitting a sample placed horizontally above a vessel and covering it to a progressively increasing water pressure on the lower surface of the substrate until passage of water takes place at three points. The pressure is noted at the instant the water passes through the substrate at the third point. This hydrostatic pressure is a measure of the substrate's resistance to the passage of water.

Water-repellency test

Water-repellency was measured using solutions numbered from 1 to 10 and consisting of water/isopropanol mixtures in the following weight proportions:

| Test solution | Water | Isopropanol |
|---|---|---|
| 1 | 90 | 10 |
| 2 | 80 | 20 |
| 3 | 70 | 30 |
| 4 | 60 | 40 |
| 5 | 50 | 50 |
| 6 | 40 | 60 |
| 7 | 30 | 70 |
| 8 | 20 | 80 |
| 9 | 10 | 90 |
| 10 | 0 | 100 |

The test consisted of depositing drops of this mixture onto the treated substrates and then observing the resulting effect. A value is given to the number that corresponds to the solution containing the highest percentage of isopropanol which has not penetrated or wetted the substrate after 30 seconds contact.

EXAMPLE 1

In a reaction vessel of 500 volume parts, fitted with an agitator, a thermometer, a reflux refrigerant, a separatory funnel, a nitrogen supply and a heating device, 90 parts of N-methylpyrrolidone-2, 20 parts of acetone, 16 parts of dimethylaminoethyl methacrylate, 10 parts of vinyl acetate, 0.8 parts of 4,4'-azo-bis(cyano-4-pentanoic) acid, 81.4 parts of a mixture of fluorine containing sulfamido-alcohol acrylate mixture of formula:

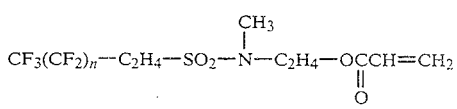

where n is 5, 7, 9, 11, 13 was added in average and respective ratios of 57/30/9/3/1.

Heating was carried out at 85° C. under a nitrogen atmosphere for 6 hours; after this, 8 parts of acetic acid in 150 parts of water was added. This was kept for an hour at 75° C. and then cooled down to ambient temperature.

370 parts of a solution (S$_1$) of a copolymer according to the invention was thus obtained, containing 27.9% of dry matter and 9.75% of fluorine.

EXAMPLE 2

The same procedure was used as in example 1, with the dimethylaminoethyl methacrylate being replaced by an identical weight of N-tertiobutylaminoethyl.

Thus, 375 parts of a solution (S2) of a copolymer according the invention was obtained, containing 27.3% of dry matter and 9.5% of fluorine.

EXAMPLE 3

3a) Using the same apparatus as an example 1 and the same method, the following was copolymerized: 81.4 parts of a mixture of fluorine-containing acrylates of formula:

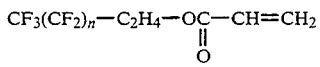

where n is 5, 7, 9, 11, 13 in average respective weight ratios of 1/63/25/9/3; 16 parts of dimethylaminoethyl methacrylate, 10 parts of vinyl acetate in 90 parts of propyleneglycol methylic ether and 10 parts of acetone, in the presence of 0.8 parts of 4-4'-azo bis(cyano-4-pentanoic) acid. After dilution as in example 1, 370 parts of a solution (S3) of copolymer containing 23% of dry matter and 11% of fluorine was obtained.

3b) The copolymers obtained in examples 1, 2 and 3a) were tested in size-press paper processing, and with an equal fluorine content, were compared with the following products:

(A) a copolymer based on 85% of polyfluorinated monomers such as described in example 1 and 15% of N-dimethylaminoethyl methacrylate amine salt, prepared in according to example 1 of U.S. Pat. No. 4,147,851;

(B) a copolymer based on 70% of the mixture of polyfluorinated monomers such as described in example 1 and 30% of N-dimethylaminoethyl methacrylate amine oxide, prepared according to example 2 of U.S. Pat. No. 4,147,851;

(C) polyfluorinated alcohol phosphate of formula:

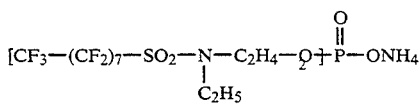

described in example 5 of French patent 1 317 427.

This products were applied onto unsized paper of the following composition:
foliaceous and resinous-based (60% and 40% respectively) bleached Kraft pulp refined to 35° SR;
adjuvants: talc (15%), retention agent: Retaminol E by Bayer (3%).

The weight of the paper was 70 g/m².

Five baths each containing 0.7 g of fluorine per liter were prepared. The compositions are given in the table below:

| Components of a bath (g/l) | Bath number | | | | | |
|---|---|---|---|---|---|---|
| | 1 | 2 | 3 | 4 | 5 | 6 |
| solution S1 of example 1 | 7.2 | | | | | |
| solution S2 of example 2 | | 7.4 | | | | |
| solution S3 of example 3a | | | 6.4 | | | |

-continued

| Components of a bath (g/l) | Bath number | | | | | |
|---|---|---|---|---|---|---|
| | 1 | 2 | 3 | 4 | 5 | 6 |
| solution of copolymer A having 16.6% non-volatile matter and 6.5% fluorine | | | | 10.8 | | |
| solution of copolymer B having 15.3% non-volatile matter and 4.9% fluorine | | | | | 14.4 | |
| solution of copolymer C having 35.7% non-volatile matter and 18.8% fluorine | | | | | | 3.8 |
| Water | 992.8 | 992.6 | 993.6 | 989.2 | 985.6 | 996.2 |
| Total | 1 000 | 1 000 | 1 000 | 1 000 | 1 000 | 1 000 |

Five sheets of paper were subjected to size-press treatment in each one of the baths. The discharge rate was around 85%. The sheets were dried for 1 minute 30 seconds at 110° C. Their characteristics are given in the table below and compared with those of untreated paper.

| Characteristics | Paper treated with bath no. | | | | | | untreated paper |
|---|---|---|---|---|---|---|---|
| | 1 | 2 | 3 | 4 | 5 | 6 | |
| Oil-repellency (kit-value) | 9 | 8/9 | 9 | 9 | 5 | 9 | 0 |
| "water barrier" effect, stain area (mm²). | 55 | 70 | 90 | 207 | 477 | >700 | >700 |
| "solvent barrier" effect area of stain (mm²). | 0 | 40 | 20 | 140 | 780 | 155 | >900 |

The results in this table show that the copolymers according to the invention conferred properties as regards both oil repellency and water repellency to the paper which were remarkable.

EXAMPLE 4

The same procedure was followed as in example 1, with the mixture of fluorinated sulfamido-alcohol acrylates being replaced by a mixture of fluorinated alcohol acrylates of formula:

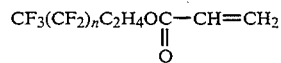

where n is equal to 5, 7, 9, 11, 13 in respective average weight ratios of 1/63/25/9/3.

370 parts of copolymer solution (S4) were obtained containing 25% dry matter and 12% fluorine.

4a) Size-press treatment baths were prepared in which the S4 or C concentration was variable (see table below).

| Bath composition (g/l) | Bath no. | | | | | | | |
|---|---|---|---|---|---|---|---|---|
| | 7 | 8 | 9 | 10 | 11 | 12 | 13 | 14 |
| S4 solution | 6 | 8 | 10 | 12 | | | | |
| C compound solution having 35.7% non-volatile matter and 8.8% fluorine | | | | | 6 | 8 | 10 | 12 |
| water | 994 | 992 | 990 | 988 | 994 | 992 | 990 | 988 |

-continued

| Bath composition (g/l) | Bath no. | | | | | | | |
|---|---|---|---|---|---|---|---|---|
| | 7 | 8 | 9 | 10 | 11 | 12 | 13 | 14 |
| Total | 1 000 | 1 000 | 1 000 | 1 000 | 1 000 | 1 000 | 1 000 | 1 000 |

The fluorine content of the C-containing aqueous solutions was systematically higher than the fluorine content of S4 solutions for identical C and S4 concentrations. For example, a solution containing 6.0 g/l of product corresponds to a fluorine concentration of 1.1 g/l in the case of C, and 0.7 g/l in the case of S4. These products were applied by size press onto a paper composed of bleached Kraft foliaceous-based pulp, refined to 25° SR of weight 66.2 g/m². The removal ratio was of the order of 110%. After drying for one minute 30 seconds at 110° C., and then for five minutes at 90° C., under vacuum, using equipment from the Frank company, the thus treated paper, together with a sample of untreated paper, were subjected to the Cobb test and to oil-repellency testing (kit value). The results are summarized in the table below:

| Characteristics | Paper treated with bath no. | | | | | | | | untreated paper |
|---|---|---|---|---|---|---|---|---|---|
| | 7 | 8 | 9 | 10 | 11 | 12 | 13 | 14 | |
| Cobb value (g/m²) | Z31 | 26 | 28 | 28 | 190 | 190 | 190 | 190 | 190 |
| Oil-repellency (kit-value) | 9 | 10 | 12 | 12 | 9 | 9 | 10 | 10 | 0 |

Examination of the table shows that the paper treated with the copolymers according to the invention (baths Nos. 7 to 10) had an excellent degree of sizing and very good oil-repellency properties.

4b) 20 g of bleached foliaceous-based Kraft pulp refined to 25° SR, were dispersed in 2.4 l of water for 45 minutes, the pH being adjusted to 6.5 using $H_2SO_4$. The following was then added to the dispersion while agitating it:
either 0.5 g of solution S4,
or 0.3 g of C to which 0.2 g of a retention agent, cartaretine, manufactured by Sandoz was added.

The aqueous pulp thus prepared contained 0.06 g of fluorine. By separating the above into nine fractions of 270 g and diluting each of them with 2.0 l of water, with stirring, it was possible to obtain nine small paper forms using vacuum filtration in the bowl of a Frank papermaking machine. The forms thus obtained were dried under vacuum for 5 minutes at 90° C. on the plates of the Frank machine. The sheets of paper treated at the papermaking stage had the characteristics summarized in the table below, comparison being provided with an untreated sheet of paper

| Characteristics | form treated by | | untreated form |
|---|---|---|---|
| | S4 | C | |
| oil-repellency (kit value) | 12 | 12 | 0 |
| Cobb value (g/m²) | 25 | 190 | 190 |

Study of the table shows that the paper treated at this stage with the copolymer according to the invention (S4) had very high oil-repellency and an excellent degree of sizing.

EXAMPLE 5

100 parts of N-methylpyrrolidone, 14 parts of N,N-dimethylaminoethyl methacrylate, 5 parts of vinyl acetate, 0.8 parts of 4,4'-azo-bis(cyano-4-pentanoic) acid, 81.4 parts of a mixture of fluorinated monomers such as described in example 4 were charged into the same apparatus as the one used in example 1. Heating was carried out to 85° C. under a nitrogen atmosphere for 10 hours after which 8 parts of acetic acid in 160 parts water was added the mixture being kept at 75° C. for 1 hour and then cooled down to ambient temperature.

360 parts of solution (S5) in accordance to the invention were obtained containing 23.5% dry matter and 12% fluorine. This solution (S5) did not have a flash point between 0° and 100° C. in accordance with ASTM D3828.

5a/ When applied under the same conditions as in example 4b, but in an amount of 0.6 g, copolymer (S5) conferred the following characteristics to the paper:
oil-repellency (kit-value) 11
Cobb value 43 g/m²

5b/ A size press bath was prepared in which the concentration of S5 was 8 g/l. When applied under the same conditions as in example 4a, this copolymer conferred the following characteristics to the paper:
oil-repellency (kit-value) 10
Cobb value 30 g/m²

EXAMPLE 6

The same procedure was followed as in example 1 using the following charges: 90 parts of N-methylpyrrolidone, 15 parts of N-tertiobutylaminoethyl methacrylate, 7.5 parts of vinyl acetate, 20 parts of acetone, 0.8 parts of 4,4'-azo-bis(cyano-4-pentanoic) acid and 81.4 parts of a mixture of fluorinated monomers, as described in example 4. Polymerisation together with dilution were carried out as in example 4.

355 parts of solution (S6) were obtained containing 24% dry matter and 11.9% fluorine.

6a/ Applied under the same conditions and in the same proportions as in example 5a, this copolymer conferred the following characteristics to the paper:
oil-repellency (kit-value) 12
Cobb value 21 g/m²

6b/ A size-press bath in which the concentration of (S6) was 8 g/l was prepared, when applied under the same conditions as in example 3b, this copolymer conferred the following characteristics to the paper:
oil-repellency (kit-value) 11
"water barrier" effect, area
of stain 120 mm²
"solvent barrier" effect, area of stain 0

EXAMPLE 7

The same procedure was followed as in example 4, with the N-methylpyrrolidone being replaced by the equivalent amount of isopropanol. 360 parts of solution (S7) were obtained and containing 25% dry extract and 12% fluorine. Whereas solution (S4) synthesized in N-methylpyrrolidone was homogeneous, solution (S7) was cloudy and showed a tendency to decantation.

Size press baths were prepared in which the (S7) or (S4) concentration was 8 g/l. When applied under the same conditions as in example 3b, these copolymers conferred the characteristics in the following table to the paper:

| Characteristics | Paper treated with | |
| --- | --- | --- |
| | S4 | S7 |
| oil-repellency (kit value) | 12 | 8 |
| "water barrier" effect, area of stain in mm$^2$ | 100 | 270 |
| "solvent barrier" effect, area of stain in mm$^2$ | 0 | 0 |

It was observed that using N-methylpyrrolidone as a polymerization solvent to replace isopropanol not only led to a solution which was perfectly clear and stable, but which also led to a spectacular improvement in the application properties of the final product.

EXAMPLE 8

The same procedure as in example 5 was followed, using the following charges: 100 parts N-methylpyrrolidone, 16 parts N,N-dimethylaminoethyl methacrylate, 3 parts vinyl acetate, 7 parts butyl methacrylate, 0.8 parts 4,4'-azo-bis(cyano-4-pentanoic) acid and 81.4 parts of the mixture of fluorinated monomers as described in example 4.

355 parts of solution (S8) were obtained containing 26.9% dry extract and 13% fluorine.

A size-press bath was prepared in which the concentration of (S8) was 7.5 g/l. When applied in the same conditions as in example 3b, this copolymer conferred the following characteristics to the paper:
  oil-repellency (kit-value) 10
  "water barrier" effect, area of stain 70 mm$^2$
  "solvent barrier" effect, area of stain 0

EXAMPLE 9

The same procedure was followed as in example 6, using the following charges: 90 parts N-methylpyrrolidone, 14 parts N,N-dimethylaminoethyl methacrylate, 3 parts vinyl acetate, 20 parts acetone, 0.8 parts 4,4'-azo-bis(cyano-4-pentanoic) acid and 81.4 parts of the mixture of fluorinated monomers as described in example 4.

Polymerization together with dilution were carried out as in example 4.

340 parts of a solution (S9) were obtained containing 24% dry matter and 12.6% fluorine.

In a padding bath consisting of 20 parts of solution (S9) and 980 parts water, a polypropylene non-woven was padded with a squeezing ratio of 138%, and then dried for 3 minutes at 120° C. in a Benz thermocondensor.

The following table summarizes the characteristics of the thus-treated non-woven in comparison with those of an untreated non-woven product.

| Characteristic | Polypropylene non-woven | |
| --- | --- | --- |
| | treated | untreated |
| water-repellency (water/IPA test) | 3 | 1 |
| resistance to hydrostatic pressure NF G07-057-(1966) (cm water) | 32 | 20 |

EXAMPLE 10

Under the same conditions as in example 1, 16 parts on N,N-dimethylaminoethyl methacrylate, 3 parts vinyl acetate, 81.4 parts of a mixture of fluorine-containing monomers as described in example 4 were copolymerized in 90 parts of N-methylpyrrolidone and 20 parts acetone, in the presence of 0.8 parts of 4,4'-azo-bis(-cyano-4-pentanoic) acid.

After dilution with 8 parts of acetic acid in 135 parts water, 355 parts of a solution (S10) of the polymer according to the invention were obtained containing 24.4% dry matter and 12.6% fluorine.

The solution S10 was employed for treating leather on a fulling machine. The procedure was as follows:

A piece of calf leather was initially re-tanned, dyed and treated by the following procedure well known to those skill in the art:
  remoistening:
    water at 40° C. 1000%
    ammonia 2%
      rotation 60 minutes
  rinsing:
    water at 40° C. 1000%
      rotation 10 minutes
  retanning:
    water at 40° C. 1000%
    retanning agent Chromitan B from BASF 10%
      rotation 90 minutes
  rinsing:
    water at 40° C. 1000%
      rotation 10 minutes
  dyeing-tawing:
    water at 50° C. 1000%
    ammonia 1%
      rotation 5 minutes
    dyeing agent Luganil Blue NL from BASF 4%
      rotation 60 minutes
    Hoechst Derminol-Licker EMP tawing oil 6%
      rotation 60 minutes
    formic acid 2%
      rotation 15 minutes
    formic acid 2%
      rotation 15 minutes
    pH ≃3.4

The percentages are based on the weight of leather.

Waterproofing and oil-proofing treatment was then carried out under the following conditions:
  water at 40° C. 500%
  solution S10 6%
    rotation 30 minutes
  rinsing:
    water at 20° C. 1000%
      rotation 5 minutes The characteristics of the thus-treated leather are given in the table below together with those of an untreated sample of leather used as a control.

| Characteristics | Calf leather | |
| --- | --- | --- |
| | treated | untreated |
| water-repellency (water/IPA test) | 3 | 0 |
| Oil-repellency AATCC 118 standard (1972) | 4 | 0 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Fluorine-containing copolymers, optionally in salt or quaternized form, consisting essentially of by weight:
   (a) 92 to 50% of at least one polyfluorinated monomer of formula:

$$Rf-B-O-\underset{\underset{R}{|}}{\overset{\overset{O}{\|}}{C}}-C=CH-R \quad (I)$$

in which:
   Rf is a straight chain or branched perfluorinated radical, having 2 to 20 carbon atoms;
   B is a bivalent bridge linked to O by a carbon atom and being able to include at least one oxygen, sulfur and/or nitrogen atom;
   one symbol R representing a hydrogen atom and the other symbol R being a hydrogen atom or an alkyl radical having 1 to 4 carbon atoms;
   (b) 1 to 25% of at least one monomer of formula:

$$\underset{R_2}{\overset{R_1}{\diagdown}}N-B'-O-\underset{\underset{R'}{|}}{\overset{\overset{O}{\|}}{C}}-C=CH_2 \quad (II)$$

in which:
   B' is a straight or branched chain alkylene radical having 1 to 4 carbon atoms,
   R' is a hydrogen atom or an alkyl radical having 1 to 4 carbon atoms;
   $R_1$ and $R_2$, which is the same or different, each represent a hydrogen atom or a linear or branched alkyl radical containing 1 to 18 carbon atoms, hydroxyethyl or benzyl, or $R_1$ and $R_2$ together with the nitrogen atom to which they are bound form a morpholino, piperidino or pyrrolidinyl-1 radical;
   (c) 1 to 25% of a vinylic compound defined by the formula:

$$R''-CH=CH_2 \quad (III)$$

in which:
   R'' is an alkylcarboxylate group containing 1 to 18 carbon atoms;
   (d) 0 to 10% of a monomer selected from the group consisting of:
   (1) ethylene, propylene, isobutene, chloro-3-isobutene-1, butadiene, isoprene, chloro- and dichloro-butadienes, fluoro- and difluoro-butadienes, and dimethyl-2, 5-hexadiene-1, 5, diisobutylene;
   (2) vinylidine chloride, vinyl or vinylidine fluoride, allyl bromide and methallyl chloride;
   (3) vinyl-toluene, α-methylstyrene, α-cyanomethylstyrene, divinylbenzene, and N-vinylcarbazole;
   (4) methylvinylketone;
   (5) methacrylic α-chloroacrylic, crotonic, maleic, fumaric, itaconic, citraconic and senecioic acid, and anhydrides and esters thereof including allyl, methyl, butyl, isobutyl, hexyl, heptyl, ethyl-2-hexyl, cyclohexyl, lauryl, stearyl or cellosolve acrylates and methacrylates, dimethyl maleate, ethyl crotonate, methyl acid maleate, butyl acid itaconate, glycol or polyalkyleneglycol diacrylates and dimethacrylates;
   (6) acrylonitrile, methacrylonitrile, chloro-2-acrylonitrile, cyano-2-ethyl acrylate, methylene glutaronitrile, vinylidene cyanate, isopropyl cyanoacrylate, trisacryloyl-hexahydro-s-triazine, vinyltrichlorosilane, vinyltrimethoxysilane and vinyltriethoxysilane;
   (7) allyl alcohol, allylglycolate, isobutenediol, allyloxy-ethanol, o-allylphenol, divinylcarbinol, glycerol-allylether, acrylamide, methacrylamide, maleamide and maleimide, N-(cyanoethyl)acrylamide, N-isopropyl-acrylamide, diacetoneacrylamide, N-(hydroxymethyl)-acrylamide and methacrylamide, N-(alkoxymethyl)-acrylamides and methacrylamides, glyoxal-bis-acrylamide, sodium acrylate, methacrylate, sulfo-2-ethyl acrylate, vinyl-sulfonic and styrene-p-sulfonic acids and alkaline salts thereof, amino-3-crotononitrile, monoallylamine, vinylpyridines, glycidyl acrylate or methacrylate allylglycidylether, and acroleine; and allyl-acetate and allyl heptanoate; and excluding N-vinyl-pyrrolidone.

2. Fluorine-containing copolymers according to claim 1, comprising, by weight, 90 to 70% of polyfluorinated monomer or monomers of formula (I), 8 to 18% of monomer(s) of formula (II), 2 to 10% of monomer(s) of formula (III) and from 0 to 8% of another monomer (d).

3. Fluorine-containing copolymers according to claim 1, wherein the polyfluorinated monomer or monomers are prepared by esterification by means of a monocarboxylic alkene acid of formula:

$$HO-\underset{\underset{O}{\|}}{\overset{\overset{R}{|}}{C}}-C=CH-R$$

of a polyfluorinated alcohol selected from the group consisting of alcohols of formulae:

$$R_f-(CH_2)_p-SO_2N-(CH_2)_q-OH \quad (VI-1)$$
$$\phantom{R_f-(CH_2)_p-SO_2N}|\phantom{-(CH_2)_q-OH}$$
$$\phantom{R_f-(CH_2)_p-SO_2N}R$$

$$R_f-SO_2N-(CH_2)_q-OH \quad (VI-2)$$
$$\phantom{R_f-SO_2N}|$$
$$\phantom{R_f-SO_2}R$$

$$R_f-(CH_2)_p-OH \quad (VI-3)$$
$$R_f-(CH_2)_p-O-(CH_2)_q-OH \quad 2(VI-4)$$
$$R_f-(CH_2)_p-S-(CH_2)_q-OH \quad (VI-5)$$
$$R_f-(CH_2)_p-(OCH_2CH_2)_q-OH \quad (VI-6)$$
$$R_f-(CH_2)_p-SO_2-(CH_2)_q-OH \quad (VI-7)$$

$$R_f-\underset{\underset{O}{\|}}{\overset{\overset{R}{|}}{C}}-N-(CH_2)_p-OH \quad (VI-8)$$

$$R_f-\underset{\underset{O}{\|}}{C}-O-(CH_2)_p-OH \quad (VI-9)$$

-continued $$R_f-CH=CH-(CH_2)_p-OH \quad (VI-10)$$

in which $R_f$ and R have the same meaning as in claim 1, the symbols p and q, which can be the same different, each represent a whole number ranging from 1 to 20.

4. Fluorine-containing copolymers according to claim 3 obtained starting from a mixture of monomers of formulae (VI.1) to (VI.10) having differing $R_f$ radicals.

5. Fluorine-containing copolymers according to claim 1, wherein the monomer of formula (II) is dimethylaminoethyl methacrylate or N-tertiobutylaminoethyl methacrylate.

6. Fluorine-containing copolymers according to claim 1, wherein the monomer of formula (III) is vinyl acetate.

7. Fluorine-containing copolymers according to claim 1, wherein the copolymerization solvent is N-methylpyrrolidone, or mixtures thereof, optionally with acetone.

8. Fluorine-containing copolymers according to claim 1, wherein $R_f$ has 4 to 16 carbon atoms.

9. Fluorine-containing copolymers according to claim 3, wherein p and q range from 2 to 4.

10. Fluorine-containing copolymers, optionally in salt or quaternized form, consisting essentially of, by weight:

(a) 92 to 50% of one or several polyfluorinated monomer of formula:

$$Rf-B-O-\overset{O}{\underset{}{C}}-\underset{R}{\overset{}{C}}=CH-R \quad (I)$$

in which:
Rf is a straight chain or branched perfluorinated radical, having 2 to 20 carbon atoms;
B is a bivalent bridge linked to O by a carbon atom and being able to include at least one oxygen, sulfur and/or nitrogen atom;
one symbol R representing a hydrogen atom and the other symbol R being a hydrogen atom or an alkyl radical having 1 to 4 carbon atoms;

(b) 1 to 25% of an least one monomer of formula:

$$\underset{R_2}{\overset{R_1}{\diagdown}}N-B'-O-\overset{O}{\underset{R'}{\overset{\|}{C}}}-\overset{}{\underset{}{C}}=CH_2 \quad (II)$$

in which:
B' is a straight or branched chain alkylene radical having 1 to 4 carbon atoms,
R' is a hydrogen atom or an alkyl radical having 1 to 4 carbon atoms;
$R_1$ and $R_2$, which can be the same or different, each represent a hydrogen atom or a linear or branched alkyl radical containing 1 to 18 carbon atoms, hydroxyethyl or benzyl, or $R_1$ and $R_2$ together with the nitrogen atom to which they are bound form a morpholino, piperidino or pyrrolidinyl-1 radical;

(c) 1 to 25% of a vinylic derivative of formula:

$$R''-CH=CH_2 \quad (III)$$

in which:
R" can be an alkylcarboxylate group containing 1 to 18 carbon atoms;

(d) 0 to 10% of a monomer selected from the group consisting of:
(1) halogenated or unhalogenated lower olefinic hydrocarbons;
(2) vinyl, allyl, or vinylidene halides;
(3) styrene and derivatives thereof;
(4) alkylvinyl ketones;
(5) unsaturated esters of formula:

$$R_f-CH_2-\underset{OH}{\overset{}{CH}}-CH_2-O\overset{O}{\underset{}{\overset{\|}{C}}}-\underset{}{\overset{R}{\overset{|}{C}}}=CH-R \quad (VII)$$

obtained by condensation of a fluorine-containing epoxide:

$$R_f-CH_2-CH-CH_2$$
$$\diagdown O \diagup$$

on a monocarboxylic alkene acid of formula (V); and (6) chlorides of formula (IX):

$$ClCH_2-\underset{OH}{\overset{}{CH}}-CH_2-O\overset{O}{\underset{}{\overset{\|}{C}}}-\underset{}{\overset{R}{\overset{|}{C}}}=CH-R \quad (IX)$$

obtained by addition of epichlorhydrine onto an acid of formula (V);

(7) mono-and poly-ethyleneglycol or -propyleneglycol ether acrylates and methacrylates of formula:

$$R_4O(CH_2-\underset{}{\overset{R_3}{\overset{|}{CH}}}-O)_n-\underset{}{\overset{}{\overset{O}{\overset{\|}{C}}}}-\underset{}{\overset{R}{\overset{|}{C}}}=CH_2 \quad (X)$$

in which $R_3$ represent a hydrogen atom or a methyl radical; $R_4$ represent an alkyl radical and n is a whole number between 1 and 10;

(8) acrylonitrile, methacrylonitrile, chloro-2-acrylonitrile cyano-2-ethyl acrylate, methylene glutaronitrile, vinylidene cyanide, alkyl cyanoacrylates, isopropyl cyanoacrylate, trisacryloyl-hexahydro-s-triazine, vinyltrichlorosilane, vinyltrimethoxysilane and vinyltriethoxysilane;

(9) allyl alcohol, allylglycolate, isobutenediol, allyloxy-ethanol, o-allylphenol, divinylcarbinol, glycerol-allylether, acrylamide, methacrylamide, maleamide and maleimide, N-(cyano-ethyl)acrylamide, N-isopropyl-acrylamide, diacetoneacrylamide, N-(hydroxymethyl)-acrylamide and methacrylamide, N-(alkoxymethyl)-acrylamides and methacrylamides, glyoxal-bis-acrylamide, sodium acrylate or methacrylate, sulfo-2-ethyl acrylate, vinyl-sulfonic and styrene-p-sulfonic acids and alkaline salts thereof, amino-3-crotononitrile, monoallylamine, vinylpyridines, glycidyl acrylate or methacrylate, allylglycidylether, and acroleine; and excluding N-vinyl-pyrrolidone;

(10) allyl esters.

11. Fluorine-containing copolymers according to claim 10, wherein polyfluorinated monomer or monomers are prepared by esterification by means of a monocarboxylic alkene acid of formula:

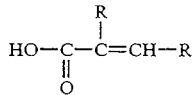

of a polyfluorinated alcohol selected from the group consisting of alcohols of formula:

$$R_f-(CH_2)_p-SO_2N-(CH_2)_q-OH \quad (VI-1)$$
$$\phantom{R_f-(CH_2)_p-SO_2N-(CH_2)_q-OH}R$$

$$R_f-SO_2N-(CH_2)_q-OH \quad (VI-2)$$
$$\phantom{R_f-SO_2N-(CH_2)_q-OH}R$$

$$R_f-(CH_2)_p-OH \quad (VI-3)$$

-continued $$R_f-(CH_2)_p-O-(CH_2)_q-OH \quad (VI-4)$$

$$R_f-(CH_2)_p-S-(CH_2)_q-OH \quad (VI-5)$$

$$R_f-(CH_2)_p-(OCH_2CH_2)_q-OH \quad (VI-6)$$

$$R_f-(CH_2)_p-SO_2-(CH_2)_q-OH \quad (VI-7)$$

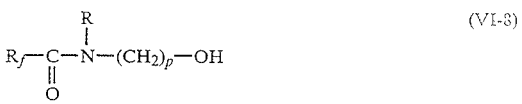

$$R_f-C-O-(CH_2)_p-OH \quad (VI-9)$$

$$R_f-CH=CH-(CH_2)_p-OH \quad (VI-10)$$

in which $R_f$ and R have the same meaning as in claim 12, the symbols p and q, which can be the same or different, each represent a whole number ranging from 1 to 20.

12. Fluorine-containing copolymers according to claim 10, wherein $R_f$ has 4 to 16 carbon atoms.

13. Fluorine-containing copolymers according to claim 11, wherein p and q range from 2 to 4.

* * * * *